(12) United States Patent
Inagaki

(10) Patent No.: US 8,641,009 B2
(45) Date of Patent: Feb. 4, 2014

(54) POSITIONER

(75) Inventor: Yohsuke Inagaki, Tokyo (JP)

(73) Assignee: Azbil Corporation, Tokyo (JP)

( * ) Notice: Subject to any disclaimer, the term of this patent is extended or adjusted under 35 U.S.C. 154(b) by 258 days.

(21) Appl. No.: 13/053,547

(22) Filed: Mar. 22, 2011

(65) Prior Publication Data

US 2011/0240891 A1    Oct. 6, 2011

(30) Foreign Application Priority Data

Mar. 30, 2010  (JP) ................................ 2010-079417

(51) Int. Cl.
 *F16K 31/02* (2006.01)
(52) U.S. Cl.
 USPC .............. 251/129.04; 137/487.5; 700/287; 700/289
(58) Field of Classification Search
 USPC .................. 137/86, 487.5; 251/30.02, 30.05, 251/129.04; 700/287, 289
 See application file for complete search history.

(56) References Cited

U.S. PATENT DOCUMENTS

| | | | | |
|---|---|---|---|---|
| 2,935,077 A | * | 5/1960 | Keyser | 137/82 |
| 2,939,472 A | * | 6/1960 | Eller | 137/82 |
| 2,949,273 A | * | 8/1960 | Gilchrist et al. | 251/26 |
| 3,219,046 A | * | 11/1965 | Waugh | 137/8 |
| 3,225,785 A | * | 12/1965 | Goike | 137/486 |
| 3,285,266 A | * | 11/1966 | De Zurik | 137/86 |
| 4,961,441 A | * | 10/1990 | Salter | 137/14 |
| 5,251,148 A | * | 10/1993 | Haines et al. | 700/282 |
| 5,549,137 A | * | 8/1996 | Lenz et al. | 137/486 |
| 6,128,541 A | * | 10/2000 | Junk | 700/39 |
| 6,202,680 B1 | * | 3/2001 | Irokawa et al. | 137/487.5 |
| 6,512,960 B1 | * | 1/2003 | Schulz | 700/56 |
| 6,907,082 B1 | * | 6/2005 | Loechner | 375/257 |
| 7,167,537 B2 | * | 1/2007 | Loechner | 375/377 |
| 7,505,818 B1 | * | 3/2009 | Kohler | 700/19 |
| 7,940,189 B2 | * | 5/2011 | Brown | 340/621 |
| 2004/0039488 A1 | * | 2/2004 | Junk et al. | 700/282 |

FOREIGN PATENT DOCUMENTS

| | | |
|---|---|---|
| JP | 62-28118 U | 2/1987 |
| JP | 11-118526 A | 4/1999 |

* cited by examiner

*Primary Examiner* — John Rivell
*Assistant Examiner* — Matthew W Jellett
(74) *Attorney, Agent, or Firm* — Troutman Sanders LLP

(57) ABSTRACT

A positioner operating mode identifying function and an use parameter selecting function are provided in a calculating unit. A positive operating parameter and a negative operating parameter are stored in a storing portion. The positioner operating mode identifying function identifies the operating mode of a positioner or from the direction of change of a control output and the direction of change of an amplified pneumatic pressure signal Pout, and the identification result is set automatically as the current operating mode of the positioner. In accordance with the current operating mode identified for the positioner, the use parameter selecting function selects, as the use parameter from the storing portion, the positive operating parameter if the positive operating mode, and the negative operating parameter if the negative operating mode, and sets the selected use parameter automatically.

6 Claims, 7 Drawing Sheets

FIG. 2

Positioner Operating Mode Identifying Logic

| Direction of Change of Control Output K | Direction of Change of Amplified Pneumatic Pressure Signal Pout | Operating Mode of Positioner |
|---|---|---|
| + | + | Positive |
| - | - | Positive |
| + | - | Negative |
| - | + | Negative |

FIG. 4

Electro-Pneumatic Converting Device Operating Mode Identification Logic

| Direction of Change of Control Output K | Direction of Change of Pneumatic Pressure Signal Pn | Operating Mode of Electro-Pneumatic Converting Device |
|---|---|---|
| + | + | Positive |
| - | - | Positive |
| + | - | Negative |
| - | + | Negative |

FIG. 5

Pilot Relay Operating Mode Identifying Logic

| Direction of Change of Pneumatic Pressure Signal Pn | Direction of Change of Amplified Pneumatic Pressure Signal Pout | Operating Mode of Pilot Relay |
|---|---|---|
| + | + | Positive |
| - | - | Positive |
| + | - | Negative |
| - | + | Negative |

FIG. 6

Positioner Operating Mode Determining Logic

| Operating Mode of Electro-Pneumatic Converting Device | Operating Mode of Pilot Relay | Operating Mode of Positioner |
|---|---|---|
| Positive | Positive | Positive |
| Negative | Negative | Positive |
| Positive | Negative | Negative |
| Negative | Positive | Negative |

FIG. 9

| Positioner Positive/Negative Operating Parameter Storing Portion | | | |
|---|---|---|---|
| | | Pilot Relay Operating Mode | |
| | | Positive | Negative |
| Electro-Pneumatic Converting Device Operating Mode | Positive | Parameter Setting 1 | Parameter Setting 2 |
| | Negative | Parameter Setting 3 | Parameter Setting 4 |

FIG. 10

| Positioner Positive/Negative Operating Parameter Storing Portion | | | |
|---|---|---|---|
| | | Pilot Relay Operating Mode | |
| | | Positive | Negative |
| Electro-Pneumatic Converting Device Operating Mode | Positive (Negative) | Parameter Setting 1 (Parameter Setting 3) | Parameter Setting 2 (Parameter Setting 4) |

FIG. 11

| Positioner Positive/Negative Operating Parameter Storing Portion | | | |
|---|---|---|---|
| | | Pilot Relay Operating Mode | |
| | | Positive (Negative) | |
| Electro-Pneumatic Converting Device Operating Mode | Positive | Parameter Setting 1 (Parameter Setting 2) | |
| | Negative | Parameter Setting 3 (Parameter Setting 4) | |

FIG. 12

| | Electro-Pneumatic Converting Device | Pilot Relay | Positioner |
|---|---|---|---|
| Operating Mode | Positive | Positive | Positive |
| | Negative | Negative | |
| | Positive | Negative | Negative |
| | Negative | Positive | |

POSITIONER

CROSS REFERENCE TO RELATED APPLICATIONS

The present application claims priority under 35 U.S.C. §119 to Japanese Patent Application No. 2010-079417, filed Mar. 30, 2010, which is incorporated herein by reference.

FIELD OF TECHNOLOGY

The present invention relates to a positioner for controlling the opening of a control valve by calculating a valve opening setting value sent from a higher-level device and an actual opening value fed back from the control valve that is being controlled, to generate, as a control output, an electric signal in accordance with the deviation, and then converting this generated control output into an air pressure signal, and then amplifying.

BACKGROUND OF THE INVENTION

Conventionally, positioners have been provided in control valves, where the valve opening of the control valve is controlled by the positioner. This positioner has a calculating unit for calculating a deviation between a control valve opening setting value sent from a higher-level device and an actual opening value that is fed back from the control valve, to generate, as a control output, an electric signal in accordance with this deviation; an electro-pneumatic converting device for converting, into a pneumatic pressure signal, the control output generated by the calculating unit; and a pilot relay for amplifying the pneumatic pressure signal, converted by the electro-pneumatic converting device and outputting the result, as a pneumatic pressure signal, to an operating device for the control valve (See, for example, Japanese Unexamined Patent Application Publication S62-28118).

In this positioner, the pneumatic converting device and pilot relay each may be of a positive operating mode or a negative operating mode. That is, the positive operating mode is of an operating system of a nature wherein the greater the input, the greater the output will be, where, on the other hand, the negative operating mode is of an operating system having a nature wherein the greater the input, the smaller the output will be. Given this, the operating mode of the positioner itself depends on the forms of operation of the built-in electro-pneumatic converting device and pilot relay. That is, as illustrated in FIG. 12, if the modes of operation of the electro-pneumatic converting device and the pilot relay are identical, then the positioner is in the positive operating mode, but if the modes of operation of the electro-pneumatic converting device and of the pilot relay are opposite from each other, then the mode of operation of the positioner is in the negative. Furthermore, the type of positioner to use, in terms of the type of operating mode, is determined by the operating mode of the control valve wherein the opening is controlled by the positioner.

Here if, for example, a change is produced so as to control a control valve of the opposite operating mode from the control valve that has been controlled until that point, or if there is a failure in a positioner that has controlled the control valve, making it necessary to replace suddenly with a spare positioner, where this spare positioner and control valve are of different operating modes, then the operating mode of the positioner is changed through changing the operating mode of the built-in electro-pneumatic converting device through changing the direction of the electric current supplied to a magnetic excitation coil (See, for example, Japanese Unexamined Patent Application Publication H11-118526). Additionally, if the pilot relay that is built into the positioner is a multimode pilot relay (of a type wherein it is possible to select the positive operating mode or the negative operating mode), then the operating mode of the positioner can be changed by selecting the opposite operating mode from that which had been used up to that point.

Furthermore, in order to control the opening of the control valve in the positioner accurately when there is a change in the operating mode of the positioner, it is necessary to set the current operating mode of the positioner itself and of each parameter for control, and the setting of the current operating mode of the positioner itself and of the various parameters are performed artificially.

However, in the positioner there is a variety of parameters such as the proportional gain, the internal gain, the differential gain, and the like, as various parameters for control, and these parameters differ depending on whether the positioner is in the positive operating mode or the negative operating mode, and depending on whether the electro-pneumatic converting device and pilot relay are in the positive operating mode or negative operating mode, where the operation for changing the settings of the various parameters is extremely complex.

That is, there are four combinations of the operating mode of the electro-pneumatic converting device and the operating mode of the pilot relay, so even if the operating mode of the positioner is the positive operating mode, there is the case wherein the operating modes of the electro-pneumatic converting device and the pilot relay are both the positive operating mode, and the case wherein they are both the negative operating mode, and even if the operating mode of the positioner is the negative operating mode, there is the case wherein the electro-pneumatic converting device is in the positive operating mode and the pilot relay is in the negative operating mode, and the case wherein the electro-pneumatic converting device is in the negative operating mode and the pilot relay is in the positive operating mode, and in some cases there are small differences in the best parameters depending on these four combinations of operating modes, and thus the operations for updating the settings of the various parameters are extremely complex.

Additionally, if, for example, the operator forgets the operation for updating the setting of the current operating mode of the positioner itself or the settings of the various parameters, or if the operator was unable to update the settings of the various parameters accurately, then the operating mode of the positioner may not match the various operating parameters in the settings, which risks the occurrence of problems, not only with preventing the correct control of the opening, but also with causing failures in the system wherein the flow of the fluid is controlled by the control valve.

The present invention was created in order to solve the problem as set forth above, and the object thereof is to provide a positioner wherein it is possible to cause the current operating mode of the positioner and the various parameters for control to be set automatically.

SUMMARY OF THE INVENTION

The invention by which to achieve this object is a positioner including control output generating means for calculating a deviation between a valve opening setting value sent from a higher-level device and an actual opening value that is fed back from a control valve that is subject to control, to generate, as a control signal, an electric signal in accordance with the deviation; electro-pneumatic converting means for converting into a pneumatic pressure signal the control output generated by the control output generating means; and pneumatic pressure signal amplifying means for amplifying the pneumatic pressure signal that was converted by the electro-pneumatic converting means and outputting, to an operating device for the control valve, as an amplified pneumatic pressure signal; comprising: positioner operating mode identifying means for identifying whether the operating mode of the positioner (the operating mode of the positioner itself) is in the positive operating mode wherein the greater the control output the greater the amplified pneumatic pressure signal, or the negative operating mode wherein the greater the control output the less the amplified pneumatic pressure signal; positioner positive/negative operating parameter storing means for storing positive operating parameters used when the operating mode of the positioner is the positive operating mode and negative operating parameters used when the operating mode of the positioner is the negative operating mode; and use parameter selecting means for selecting, as the actual parameters to be used, those parameters that correspond to the operating mode that has been identified by the positioner operating mode identifying means, of the positive operating parameters and negative operating parameters stored in the positioner positive/negative operating parameter storing means.

In this invention, the positioner operating mode identifying means identify the current operating mode of the positioner itself as the positive operating mode when the operating mode of the positioner has been changed from the positive operating mode to the negative operating mode. If the operating mode of the positioner has been changed from the negative operating mode to the positive operating mode, the current operating mode of the positioner itself is identified as the negative operating mode. Additionally, the parameter that corresponds with the operating mode identified by the positioner operating mode identifying means, of the positive operating parameter or the negative operating parameter, stored in the positioner positive/negative operating parameter storing means is selected, by the use parameter selecting means, as the parameter that is actually used. That is, when the positioner operating mode identifying means identify the current operating mode of the positioner itself as the positive operating mode, the positive operating parameters that are stored in the positioner positive/negative operating parameter storing means are selected, and when the current operating mode of the positioner result is identified as the negative operating mode, the negative operating parameters that are stored in the positioner positive/negative operating parameter storing means are selected.

The present invention makes it possible to cause the updating of the current operating mode of the positioner itself and the updating of the settings for the various parameters for control, from the identification results and selection results, through the identification, by the positioner operating mode identifying means, of the current operating mode of the positioner as either the positive operating mode or the negative operating mode, and through the selection by the use parameter selecting means, of those parameters, of the positive operating parameters and negative operating parameters that have been stored, that correspond to the identified operating mode, as the actual parameters to be used.

BRIEF DESCRIPTION OF THE DRAWINGS

FIG. 2 is a diagram illustrating an identifying logic for identifying the operating mode of the positioner by a calculating unit in the positioner.

FIG. 4 is a diagram illustrating an identifying logic for identifying the operating mode of the positioner by a calculating unit in the electro-pneumatic converting device.

FIG. 5 is a diagram illustrating an identifying logic for identifying the operating mode of the positioner by a calculating unit in the pilot relay device.

FIG. 6 is a diagram illustrating a determining logic for determining the operating mode of the positioner by a calculating unit in the positioner.

FIG. 9 is a diagram illustrating an example of storing, in a positioner positive/negative operating parameter storing portion, four different parameter settings depending on the combination of the electro-pneumatic converting device and the multimode pilot relay operating mode combinations.

FIG. 10 is a diagram illustrating an example of storing, in a positioner positive/negative operating parameter storing portion, two different parameter settings when the operating mode of the electro-pneumatic converting device is unchanging and only the operating mode of the multimode pilot relay changes.

FIG. 11 is a diagram illustrating an example of storing, in a positioner positive/negative operating parameter storing portion, two different parameter settings when the operating mode of the multimode pilot relay is unchanging and only the operating mode of the electro-pneumatic converting device changes.

FIG. 12 is a diagram illustrating the relationship between the operating modes of the electro-pneumatic converting device and the pilot relay in the positioner, and the operating mode of the positioner.

DETAILED DESCRIPTION OF THE PRESENT INVENTION

Examples according to the present invention are explained below in detail, based on the drawings.

Figure 1:
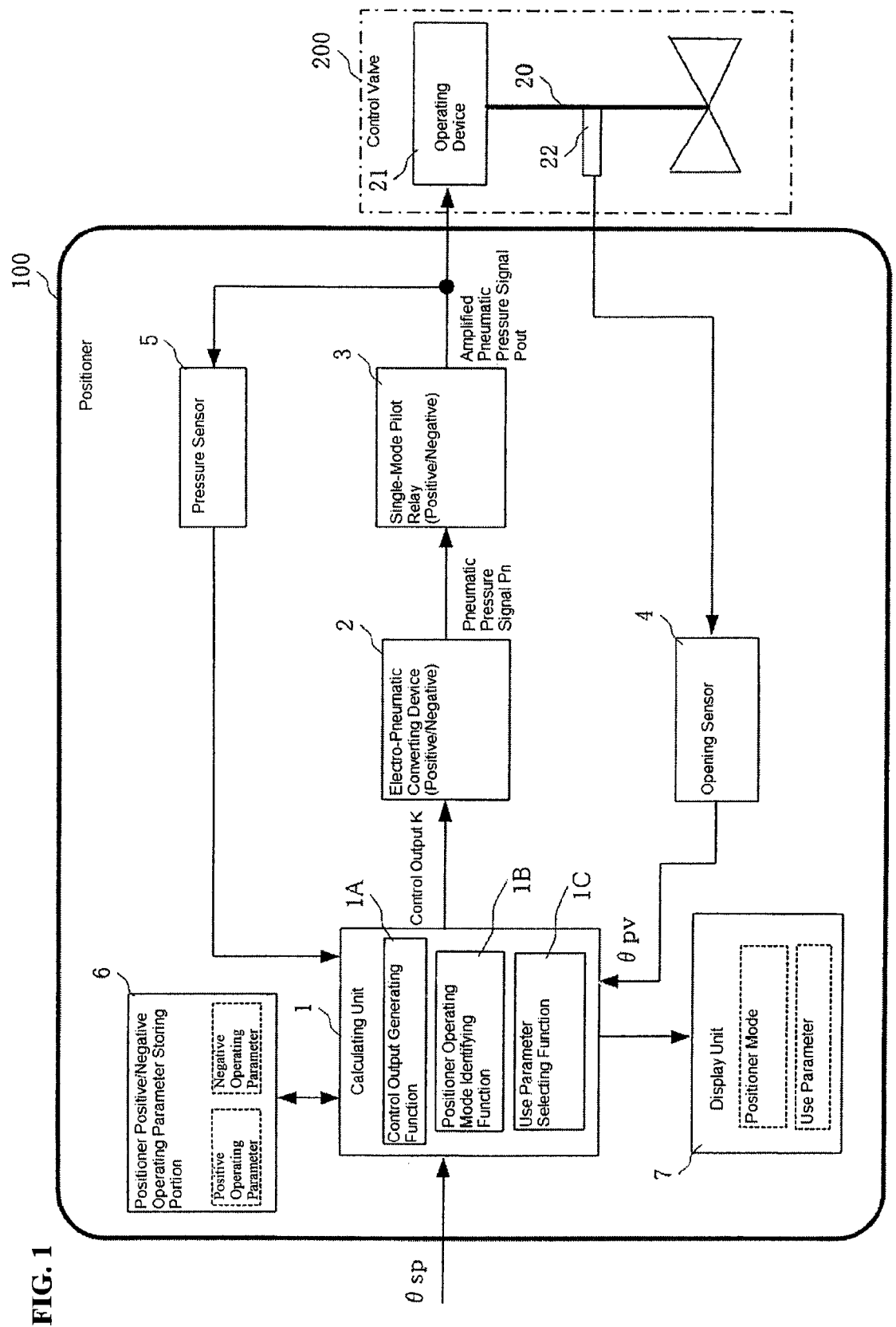
FIG. 1 is a block diagram illustrating an example of a positioner according to the present invention.

FIG. 1 is a block diagram illustrating an example of a positioner according to the present invention. In this figure, 100 is a positioner according to the present invention and 200 is a control valve wherein the opening thereof is adjusted by the positioner 100. The control valve 200 has an operating device 21 that drives a valve rod 20, and a feedback mechanism 22 that feeds back the amount of dislocation in the upward or downward direction at the valve rod 20.

The positioner 100 has a calculating unit 1 for calculating a deviation between a valve opening setting value θsp, sent from a higher-level device (not shown), and an actual opening value θpv, fed back from the control valve 200, and for generating an electric signal, as a control output K, in accordance with this deviation; an electro-pneumatic converting device 2 for converting, into a pneumatic pressure signal (a nozzle back pressure) Pn, the control output K that was generated by the calculating unit 1; a single operating mode pilot relay (hereinafter termed a single-mode pilot relay) 3 for amplifying the pneumatic pressure signal Pn, converted by the electro-pneumatic converting device 2, and outputting to an operating device 21 of the control valve 200 as an amplified pneumatic pressure signal Pout; a valve opening sensor 4; a pressure sensor 5; a positioner positive/negative operating parameter storing portion 6; and a display unit 7. The single-mode pilot relay 3 is a pilot relay wherein the operating mode is either the positive operating mode or the negative operating mode, but not both.

The valve opening sensor 4 detects the degree of opening of the control valve 200 from the amount of dislocation of the valve rod 20 fed back by the feedback mechanism 22, and sends the detected valve opening to the calculating unit 1 as the actual opening value θpv. The pressure sensor 5 detects the pressure value of the amplified pneumatic pressure signal Pout from the single-mode pilot relay 3 and sends it to the calculating unit 1.

The positive operating parameter that is used when the operating mode of the positioner 100 is the positive operating mode, and the negative operating parameter that is used when the operating mode of the positioner 100 is the negative operating mode are stored in the positioner positive/negative operating parameter storing portion 6. In this positioner 100, a proportional gain, an integral gain, a differential gain, or another type of parameter may be used as the positive operating or negative operating parameter, where each of these types of parameters are divided into those for use in a positive operating mode and those for use in a negative operating mode, and stored as the positive operating parameter and negative operating parameter in the positioner positive/negative operating parameter storing portion 6.

A calculating unit 1 is achieved through hardware including a processor, a storing portion, and the like, and a program that achieves the various functions working in cooperation with the hardware, where, in addition to the control output generating function 1A that generates the control output K, there are also, as functions that are unique to the present example, a positioner operating mode identifying function 1B and a use parameter selecting function 1C.

Positioner Operating Mode Identifying Function

The calculating unit 1 monitors the change in the amplified pneumatic pressure signal Pout corresponding to a change in the control output K through the positioner operating mode identifying function 1B to identify the operating mode of the positioner 100 as the positive operating mode if the direction of change of the control output K and the direction of change of the amplified pneumatic pressure signal Pout are the same direction, and, on the other hand, to identify the operating mode of the positioner 100 as the negative operating mode if the direction of change of the control output K and the direction of change of the amplified pneumatic pressure signal Pout are different directions. The identified operating mode is set as the current operating mode of the positioner 100 itself.

FIG. 2 illustrates the identification logic for the operating mode of the positioner by the positioner operating mode identifying function 1B. As can be seen from this identifying logic, through the positioner operating mode identifying function 1B, the calculating unit 1 identifies the operating mode of the positioner 100 as the positive operating mode if the direction of change of the control output K is "+" and the direction of change of the amplified pneumatic pressure signal Pout is "+" or if the direction of change of the control output K is "−" and the direction of change of the amplified pneumatic pressure signal Pout is "−". In contrast, it identifies the operating mode of the positioner 100 as the negative operating mode if the direction of change of the control output K is "+" and the direction of change of the amplified pneumatic pressure signal Pout is "−" or if the direction of change of the control output K is "−" and the direction of change of the amplified pneumatic pressure signal Pout is "+".

Positioner Operating Mode Display

The calculating unit 1 sends, to the display unit 7, the operating mode of the positioner 100 (the current operating mode of the positioner 100 itself), identified by the positioner operating mode identifying function 1B, to be displayed on the screen of the display unit 7. Note that the display of the use parameter may be such that it is performed only when there is an instruction from an operator. Additionally, this use parameter may be outputted to the outside on a transmission line, to notify an operator in a remote location, and to be used when performing maintenance, and the like.

Selection of the Use Parameter

In the calculating unit 1, the parameter that corresponds with the operating mode identified by the positioner operating mode identifying function 1B, of the positive operating parameter or the negative operating parameter, stored in the positioner positive/negative operating parameter storing portion 6 is selected, by the use parameter selecting function 1C, as the parameter that is actually used. Then the selected parameter is set as the use parameter for the positioner 100.

Display of the Use Parameter

Additionally, the calculating unit 1 sends, to the display unit 7, the use parameter selected by the use parameter selecting function 1C, to be displayed on the screen of the display unit 7. Note that the display of the use parameter may be such that it is performed only when there is an instruction from an operator. Additionally, this use parameter may be outputted to the outside on a transmission line, to notify an operator in a remote location, and to be used when performing maintenance, and the like.

Change in the Operating Mode of the Positioner

At this point, let us assume that the operating, mode of the positioner 100 is the positive operating mode, and it has been changed to the negative operating mode. For example, while the direction of change in the control output K was "+" and the direction of change in the amplified pneumatic pressure signal Pout was "+", let us assume that a change in the direction of the electric current supplied to the magnetic excitation coil (not shown) in the electro-pneumatic converting device 2 causes the direction of change in the control output K to be "+" and the direction of change in the amplified pneumatic pressure signal Pout to be "−".

The calculating unit 1 monitors the change in the amplified pneumatic pressure signal Pout in accordance with the change in the control output K by the positioner operating mode identifying function 1B. When the direction of change of the control output K is "+" and the direction of change in the amplified pneumatic pressure signal Pout is "−", then the calculating unit 1 identifies, through the positioner operating mode identifying function 1B, that the operating mode of the positioner 100 is the negative operating mode. The result of this identification is both set as the current operating mode of the positioner 100 itself, and displayed on the screen of the display unit 7.

Additionally, when the calculating unit identifies that the operating mode of the positioner 100 is the negative operating mode, then it selects, as the parameter to actually be used, through the use parameter selecting function 1C, the negative operating parameter corresponding to the operating mode identified, of the positive operating parameter and the negative operating parameter stored in the positioner positive/negative operating parameter storing portion 6. Furthermore, the selected parameter is set as the use parameter for the positioner 100. That is, the use parameter until that point is changed and set automatically from the positive operating parameter to the negative operating parameter. The use parameter for which the setting has been changed is displayed on the screen of the display unit 7.

Note that while in this example there was an explanation of the operating mode of the positioner 100 being the positive operating mode and changing to the negative operating mode, the same is true for the case wherein the operating mode of the positioner 100 is the negative operating mode and there is a change to the positive operating mode, where the operating mode of the positioner 100 is identified, and the identified operating mode is set as the current operating mode of the positioner 100 itself and displayed on the display unit 7. Moreover, the change in setting of the use parameter accompanying the operating mode that has been identified for the positioner 100 is performed automatically.

Additionally, while in the present example the positioner 100 identified its own operating mode automatically, instead the operating mode of the positioner 100 may be set from the outside, and the parameters to be used may be selected based on the operating mode that has been set from the outside.

Figure 3:
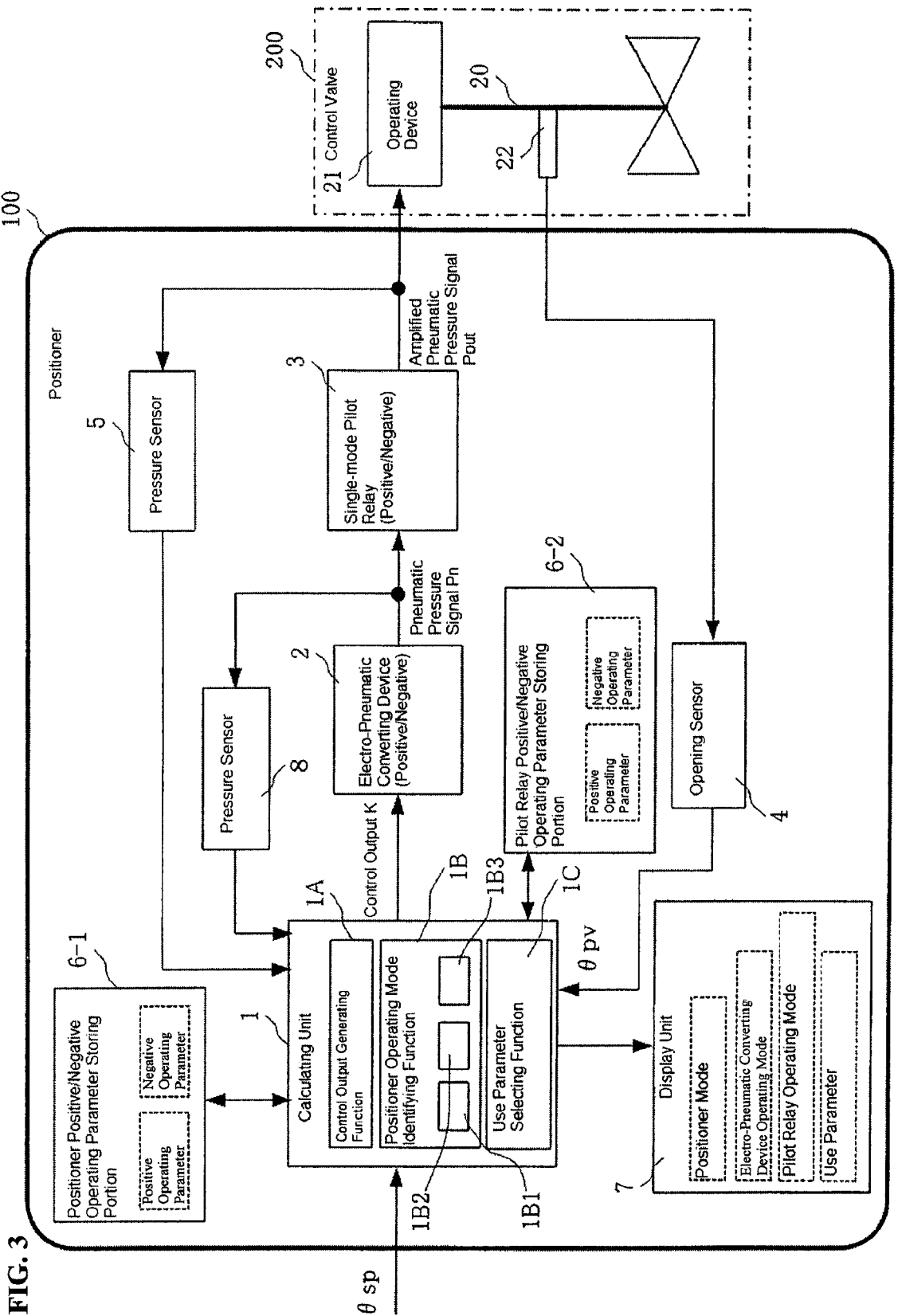
FIG. 3 is a block diagram illustrating another example of a positioner according to the present invention.

FIG. 3 is a block diagram illustrating another example of a positioner according to the present invention. In this example, a pressure sensor 8 for detecting the value of the pressure of the pneumatic pressure signal Pn from the electro-pneumatic converting device 2 is provided in addition to the structure from the example of FIG. 1, where the pressure sensor 8 sends the pressure value for the pneumatic pressure signal Pn thus detected to the calculating unit 1.

Moreover, instead of the positioner positive/negative operating parameter storing portion 6, an electro-pneumatic converter positive/negative operating parameter storing portion 6-1 and a pilot relay positive/negative operating parameter storing portion 6-2 are provided, where the positive operating parameter that is used when the operating mode of the electro-pneumatic converting device 2 is the positive mode, and the negative operating parameter that is used when the operating mode of the electro-pneumatic converting device 2 is the negative mode are stored in the electro-pneumatic converting device positive/negative operating parameter storing portion 6-1, and the positive operating parameter that is used when the operating mode of the single-mode pilot relay 3 is the positive operating mode, and the negative operating parameter that is used when the operating mode of the single-mode pilot relay 3 is the negative operating mode are stored in the pilot relay positive/negative operating parameter storing portion 6-2.

Additionally, an electro-pneumatic converting device operating mode identifying function 1B1, a pilot relay operating mode identifying function 1B2, and a positioner operating mode determining function 1B3, are provided as functions that structure the positioner operating mode identifying function 1B in the calculating unit 1.

Electro-Pneumatic Converting Device Operating Mode Identifying Function

In this example, the calculating unit 1 monitors the change in the pneumatic pressure signal Pn corresponding to a change in the control output K, through the electro-pneumatic converting device operating mode identifying function 1B1, and identifies the operating mode of the electro-pneumatic converting device 2 as the positive operating mode if the direction of change of the control output K and the direction of change of the pneumatic pressure signal Pn are the same direction, but identifies the operating mode of the electro-pneumatic converting device 2 as the negative operating mode if the direction of change of the control output K and the direction of change of the pneumatic pressure signal Pn are opposite directions.

FIG. 4 shows the logic for identifying the operating mode of the electro-pneumatic converting device in the electro-pneumatic converting device operating mode identifying function 1B1. As can be understood from this identifying logic, the calculating unit 1, through the electro-pneumatic converting device operating mode identifying function 1B1, identifies the operating mode of the electro-pneumatic converting device 2 as the positive operating mode if the direction of change of the control output K is "+" and the direction of change of the pneumatic pressure signal Pn is "+", or if the direction of change of the control output K is "−" in the direction of change of the pneumatic pressure signal Pn is "−". In contrast, it identifies the operating mode of the electro-pneumatic converting device 2 as the negative operating mode if the direction of change of the control output K is "+" and the direction of change of the pneumatic pressure signal is "−" or if the direction of change of the control output K is "−" and the direction of change of the pneumatic pressure signal Pn is "+".

Pilot Relay Operating Mode Identifying Function

In the example above, the calculating unit 1 monitors the change in the amplified pneumatic pressure signal Pout corresponding to a change in the pneumatic pressure signal Pn through the pilot relay operating mode identifying function 1B2 to identify the operating mode of the single-mode pilot relay 3 as the positive operating mode if the direction of change of the pneumatic pressure signal Pn and the direction of change of the amplified pneumatic pressure signal Pout are the same direction, and, on the other hand, to identify the operating mode of the pilot relay 3 as the negative operating mode if the direction of change of the pneumatic pressure signal Pn and the direction of change of the amplified pneumatic pressure signal Pout are different directions.

FIG. 5 illustrates the identification logic for the operating mode of the pilot relay by the pilot relay operating mode identifying function 1B2. As can be seen from this identifying logic, through the pilot relay operating mode identifying function 1B2, the calculating unit 1 identifies the operating mode of the single-mode pilot relay 3 as the positive operating mode if the direction of change of the pneumatic pressure signal Pn is "+" and the direction of change of the amplified pneumatic pressure signal Pout is "+" or if the direction of change of the pneumatic pressure signal Pn is "−" and the direction of change of the amplified pneumatic pressure signal Pout is "−". In contrast, it identifies the operating mode of the single-mode pilot relay 3 as the negative operating mode if the direction of change of the pneumatic pressure signal Pn is "+" and the direction of change of the amplified pneumatic pressure signal Pout is "−" or if the direction of change of the pneumatic pressure signal Pn is "−" and the direction of change of the amplified pneumatic pressure signal Pout is "+".

Positioner Operating Mode Determining Function

In this example, the calculating unit 1, through the positioner operating mode determining function 1B3, determines the operating mode of the positioner 100 from the identification results for the operating mode of the electro-pneumatic converting device 2 by the electro-pneumatic converting device operating mode identifying function 1B1 and the identification results for the operating mode for the single-mode pilot relay 3 by the pilot relay operating mode identifying function 1B2. The operating mode that is determined is set as the current operating mode for the positioner 100 itself.

FIG. 6 illustrates the determining logic for the operating mode of the positioner by the positioner operating mode determining function 1B3. As can be understood from this determining logic, the calculating unit 1, through the positioner operating mode determining function 1B3, determines that the operating mode of the positioner 100 is the positive operating mode when the identification result for the operating mode of the electro-pneumatic converting device 2 is "positive operating mode" and the identification result for the operating mode of the single-mode pilot relay 3 is the "positive operating mode" or when the identification result for the operating mode of the electro-pneumatic converting device 2 is "negative operating mode" and the identification result for the operating mode of the single-mode pilot relay 3 is the "negative operating mode". In contrast, the calculating unit 1, through the positioner operating mode determining function 1B3, determines that the operating mode of the positioner 100 is the negative operating mode when the identification result for the operating mode of the electro-pneumatic converting device 2 is "positive operating mode" and the identification result for the operating mode of the single-mode pilot relay 3 is the "negative operating mode" or when the identification result for the operating mode of the electro-pneumatic converting device 2 is "negative operating mode" and the identification result for the operating mode of the single-mode pilot relay 3 is the "positive operating mode". The determination result by the positioner operating mode determining function 1B3 is defined as the identification result for the operating mode of the positioner 100 by the positioner operating mode identifying function 1B.

Positioner Operating Mode Display

The calculating unit 1 sends to the display unit 7, to be displayed on the screen of the display unit 7, the operating mode of the positioner 100 (the current operating mode of the positioner 100 itself) that has been identified by the positioner operating mode identifying function 1B, the operating mode of the electro-pneumatic converting device 2 (the current operating mode of the electro-pneumatic converting device 2) that has been identified by the electro-pneumatic converting device operating mode identifying function 1B1, and the operating mode for the single-mode pilot relay 3 (the current operating mode of the single-mode pilot relay 3) that has been identified by the pilot relay operating mode identifying function 1B2.

Note that the display of the operating mode identified for the positioner (including the operating mode of the electro-pneumatic converting device and the operating mode of the pilot relay) may be such that it is displayed only when there has been an instruction from an operator. Moreover, the operating mode identified for the positioner (including the operating mode of the electro-pneumatic converting device and the operating mode of the pilot relay) may be outputted to the outside on a transmission line, to notify an operator in a remote location, and to be used when performing maintenance, and the like.

Selection of the Use Parameter

In the calculating unit 1, the parameter that corresponds with the operating mode identified by the electro-pneumatic converting device operating mode identifying function 1B1, of the positive operating parameter or the negative operating parameter, stored in the electro-pneumatic converting device positive/negative operating parameter storing portion 6-1 is selected, by the use parameter selecting function 1C, as the parameter that is actually used. Additionally, the parameter that corresponds with the operating mode identified by the pilot relay operating mode identifying function 1B2, of the positive operating parameter or the negative operating parameter, stored in the pilot relay positive/negative operating parameter storing portion 6-2 is selected as the parameter that will actually be used. Furthermore, the selected parameter is set as the use parameter for the positioner 100.

Display of the Use Parameter

Additionally, the calculating unit 1 sends, to the display unit 7, the use parameter selected by the use parameter selecting function 1C, to be displayed on the screen of the display unit 7. Note that the display of the use parameter may be such that it is performed only when there is an instruction from an operator. Additionally, this use parameter may be outputted to the outside on a transmission line, to notify an operator in a remote location, and to be used when performing maintenance, and the like.

Change in the Operating Mode of the Positioner

At this point, let us assume that the operating mode of the positioner 100 is the positive operating mode, and it has been changed to the negative operating mode. For example, while operating modes of both the electro-pneumatic converting device 2 and the single-mode pilot relay 3 were the positive operating mode and the direction of change in the control output K was "+" and the direction of change in the amplified pneumatic pressure signal Pout was "+", let us assume that a change in the direction of the electric current supplied to the magnetic excitation coil (not shown) in the electro-pneumatic converting device 2 causes the direction of change in the control output K to be "+" and the direction of change in the amplified pneumatic pressure signal Pout to be "−". In this case, the operating mode of the electro-pneumatic converting device 2 becomes the negative operating mode, and thus when the direction of change of the control output K goes to "+", the direction of change of the pneumatic pressure signal Pn goes to "−". In addition, the operating mode of the single-mode pilot relay 3 becomes the positive operating mode, and thus when the direction of change of the pneumatic pressure signal Pn goes to "−", the direction of change of the amplified pneumatic pressure signal Pout goes to "−".

The calculating unit 1 monitors the change in the pneumatic pressure signal Pn accordance with the change in the control output K by the pneumatic converting device operating mode identifying function 1B1. When the direction of change of the control output K is "+" and the direction of change in the pneumatic pressure signal Pn goes to "−", then the calculating unit 1 identifies, through the electro-pneumatic converting device operating mode identifying function 1B1, that the operating mode of the electro-pneumatic converting device 2 is the negative operating mode. That is, the current operating mode of the electro-pneumatic converting device 2 is identified as the negative operating mode.

Additionally the calculating unit 1 monitors the change in the amplified pneumatic pressure signal Pout in accordance with the change in the pneumatic pressure signal Pn by the pilot relay operating mode identifying function 1B2. When the direction of change of the pneumatic pressure signal Pn goes to "−" and the direction of change in the amplified pneumatic pressure signal Pout is "−", then the calculating unit 1 identifies, through the pilot relay operating mode identifying function 1B2, that the operating mode of the single-mode pilot relay 3 is the positive operating mode. That is, the current operating mode of the single-mode pilot relay 3 is identified as the positive operating mode.

Through this, the calculating unit 1, through the positioner operating mode determining function 1B3, determines that the operating mode of the positioner 100 is the negative operating mode from the identification result (negative operating mode) for the operating mode of the electro-pneumatic converting device 2 by the electro-pneumatic converting device operating mode identifying function 1B1 and the identification result for the operating mode (positive operating mode) for the single-mode pilot relay 3 by the pilot relay operating mode identifying function 1B2. The determination result by the positioner operating mode determining function 1B3 is defined as the identification result for the operating mode of the positioner 100 by the positioner operating mode identifying function 1B. The result of this identification is both set as the current operating mode of the positioner 100 itself, and displayed on the screen of the display unit 7.

Additionally, when the calculating unit 1 identifies that the operating mode of the electro-pneumatic converting device 2 is the negative operating mode, then it selects, as the parameter to actually be used, through the use parameter selecting function 1C, the negative operation parameter corresponding to the operating mode identified, of the positive operating parameter and the negative operating parameter stored in the electro-pneumatic converting device positive/negative operating parameter storing portion 6-1. Additionally, when the calculating unit 1 identifies that the operating mode of the single-mode pilot relay 3 is the positive operating mode, then it selects, as the parameter to actually be used, through the use parameter selecting function 1C, the positive operation parameter corresponding to the operating mode identified, of the positive operating parameter and the negative operating parameter stored in the pilot relay positive/negative operating parameter storing portion 6-2. Furthermore, the selected parameter is set as the use parameter for the positioner 100. That is, the use parameters that had been set to this point, were that the operating mode of the electro-pneumatic converting device 2 was the positive operating mode and the operating mode for the single-mode pilot relay 3 was the positive operating mode, are changed automatically to be set to use parameters wherein the operating mode for the electro-pneumatic converting device 2 is the negative operating mode and the operating mode for the single-mode pilot relay 3 is the positive operating mode. The use parameter for which the setting has been changed is displayed on the screen of the display unit 7.

Note that while in this example the explanation was for a case wherein the operating mode of the positioner 100 was the positive operating mode and there was a change to the negative operating mode, the same is true also for the case wherein the operating mode of the positioner 100 is the negative operating mode and there is a change to the positive operating mode, where the operating mode of the positioner 100 is identified based on the current operating mode of the electro-pneumatic converting device 2 and on the current operating mode of the single-mode pilot relay 3, and the identified operating mode is set as the current operating mode of the positioner 100 itself, and also displayed on the display unit 7. Additionally, the setting changes for the use parameters in accordance with the identified operating modes for the electro-pneumatic converting device 2 and the single-mode pilot relay 3 may be performed automatically.

Additionally, while in the present example the positioner 100 identified the operating modes of the electro-pneumatic converting device 2 and of the single-mode pilot relay 3 automatically, instead the operating modes of the electro-pneumatic converting device 2 and of the single-mode pilot relay 3 may be set from the outside, and the parameters to be used may be selected based on the operating mode that has been set from the outside.

Figure 7:
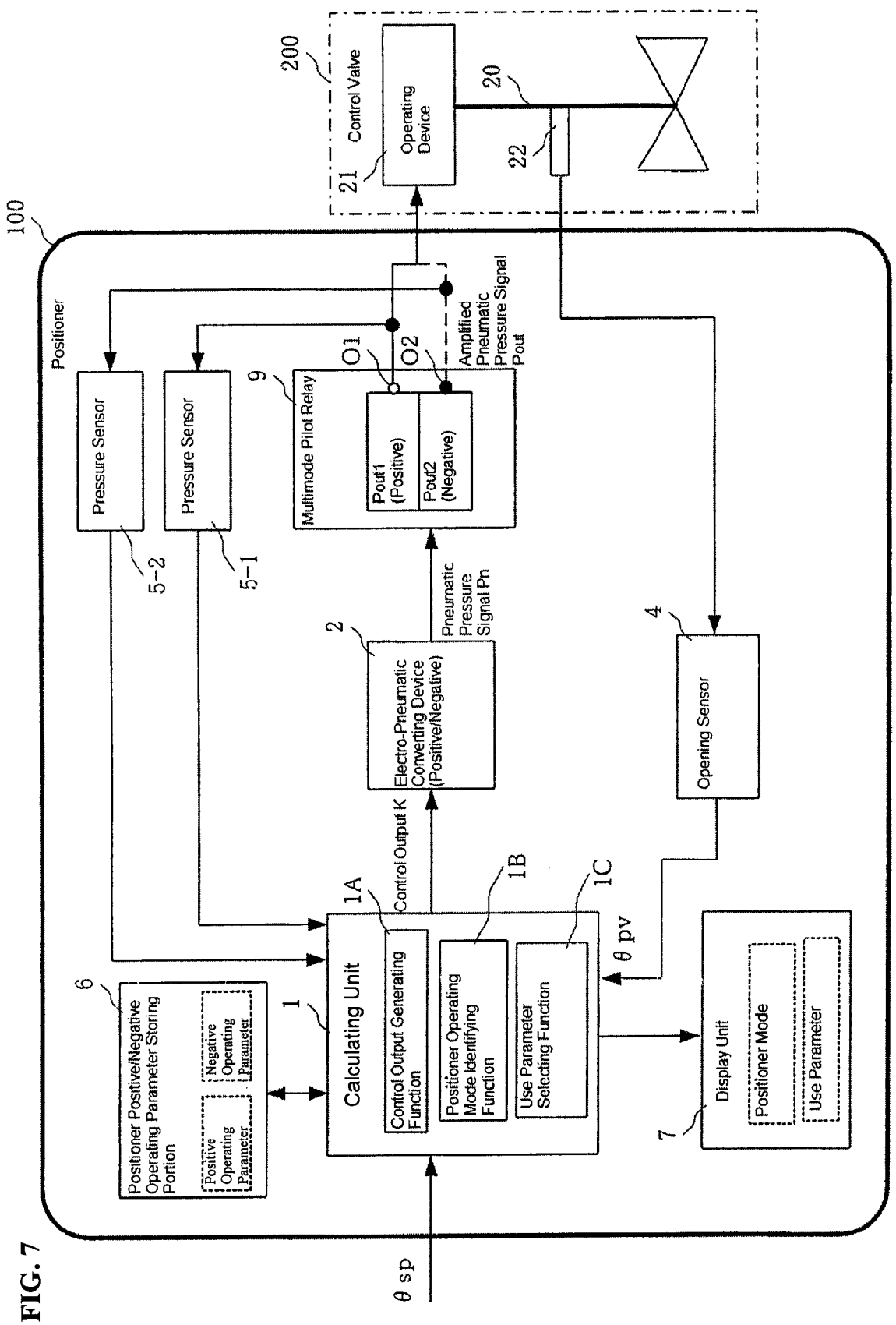
FIG. 7 is a block diagram illustrating a further example of a positioner according to the present invention.

FIG. 7 is a block diagram illustrating another example of a positioner according to the present invention. In this example, a multiple operating mode pilot relay (hereinafter termed a "multimode pilot relay") 9 is used instead of the single-mode pilot relay 3 in the structure above in FIG. 1, where a pressure value of an amplified pneumatic pressure signal Pout1, outputted from a first output port O1 of the multimode pilot relay 9 is detected by a pressure sensor 5-1, and is sent to the calculating unit 1 as the pressure value of the amplified pneumatic pressure signal Pout. Additionally, a pressure value of an amplified pneumatic pressure signal Pout2, outputted from a second output port O2 of the multimode pilot relay 9 is detected by a pressure sensor 5-2, and is sent to the calculating unit 1 as the pressure value of the amplified pneumatic pressure signal Pout.

The multimode pilot relay 9 is a pilot relay able to select either the positive operating mode or the negative operating mode as the operating mode thereof, where if the positive operating mode is selected, then the amplified pneumatic pressure signal Pout1 is outputted from the first output port O1, and if the negative operating mode is selected, then the amplified pneumatic pressure signal Pout2 is outputted from the second output port O2. In this example, as the state prior to the operating mode of the positioner 100 being changed, the multimode pilot relay 9 has the positive operating mode selected, so that the amplified pneumatic pressure value signal Pout1 is outputted from the first output port O1.

Change in the Operating Mode of the Positioner

At this point, let us assume that the operating mode of the positioner 100 is the positive operating mode, and it has been changed to the negative operating mode. For example, while the direction of change in the control output K was "+" and the direction of change in the amplified pneumatic pressure signal Pout (Pout1) was "+", let us assume the selection of the negative operating mode as the operating mode for the multimode pilot relay 9 causes the direction of change in the control output K to be "+" and the direction of change in the amplified pneumatic pressure signal Pout (Pout2) to be "−".

The calculating unit 1 monitors the change in the amplified pneumatic pressure signal Pout (Pout1, Pout2) in accordance with the change in the control output K by the positioner operating mode identifying function 1B. When, through the selection of the negative operating mode as the operating mode for the multimode pilot relay 9, the direction of change of the control output K is "+" and the direction of change in the amplified pneumatic pressure signal Pout (Pout2) is "−", then the calculating unit 1 identifies, through the positioner operating mode identifying function 1B, that the operating mode of the positioner 100 is the negative operating mode. The result of this identification is both set as the current operating mode of the positioner 100 itself, and displayed on the screen of the display unit 7.

Additionally, when the calculating unit 1 identifies that the operating mode of the positioner 100 is the negative operating mode, then it selects, as the parameter to actually be used, through the use parameter selecting function 1C, the negative operation parameter corresponding to the operating mode identified, of the positive operating parameter and the negative operating parameter stored in the positioner positive/negative operating parameter storing portion 6. Furthermore, the selected parameter is set as the use parameter for the positioner 100. That is, the use parameter until that point is changed and set automatically from the positive operating parameter to the negative operating parameter. The use parameter for which the setting has been changed is displayed on the screen of the display unit 7.

Note that in this case, the selection of the negative operating mode as the operating mode for the multimode pilot relay 9 was explained for the case wherein the operating mode of the positioner 100 was changed from the positive operating mode to the negative operating mode; however, the same is true also for the case wherein the operating mode of the electro-pneumatic converting device 2 is changed from the positive operating mode to the negative operating mode through a change in the direction of the supply of the electric current to the magnetic excitation coil, where the operating mode of the positioner 100 is identified, and that identified operating mode is set as the current operating mode of the positioner 100 itself, and also displayed on the display unit 7. Moreover, the change in setting of the use parameter accompanying the operating mode that has been identified for the positioner 100 is performed automatically.

The direction of change of the control output K is "+", the direction of change in the pneumatic pressure signal Pn is "−", and the direction of change in the amplified pneumatic pressure signal Pout (Pout1) is "−", and thus, in the calculating unit 1, the operating mode of the positioner 100 is identified as being the negative operating mode because the direction of change of the control output K is "+" in the direction of change of the amplified pneumatic pressure signal Pout (Pout 1) is "−".

Additionally, while in this example there was an explanation of the operating mode of the positioner 100 being the positive operating mode and changing to the negative operating mode, the same is true for the case wherein the operating mode of the positioner 100 is the negative operating mode and there is a change to the positive operating mode, where the operating mode of the positioner 100 is identified, and the identified operating mode is set as the current operating mode of the positioner 100 itself and displayed on the display unit 7. Moreover, the change in setting of the use parameter accompanying the operating mode that has been identified for the positioner 100 is performed automatically.

Additionally, while in the present form of embodiment the positioner 100 identified its own operating mode automatically, instead the operating mode of the positioner 100 may be set from the outside, and the parameters to be used may be selected based on the operating mode that has been set from the outside.

Figure 8:
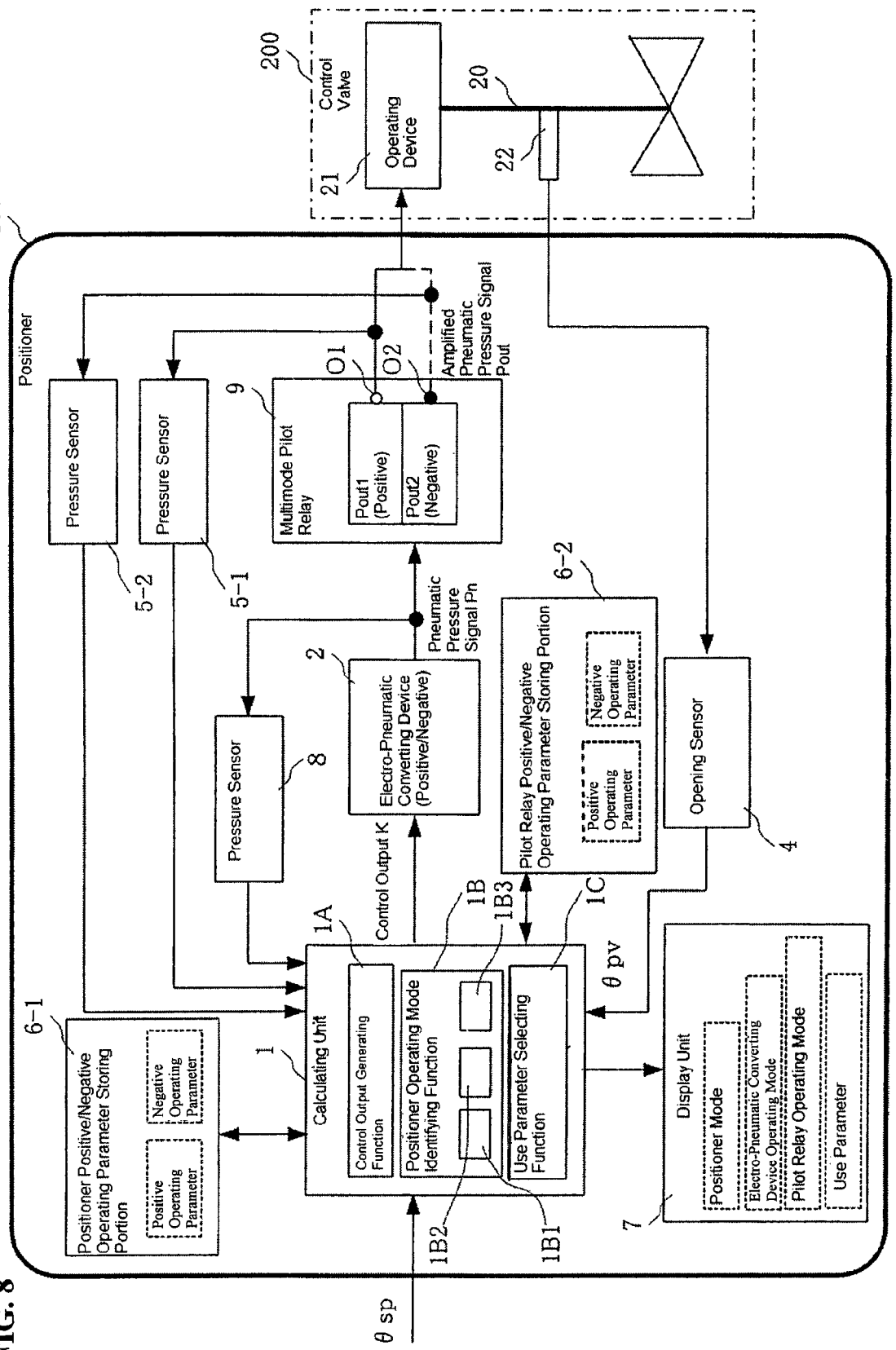
FIG. 8 is a block diagram illustrating yet another example of a positioner according to the present invention.

FIG. 8 is a block diagram illustrating yet another example of a positioner according to the present invention. In this example, a pressure sensor 8 for detecting the value of the pressure of the pneumatic pressure signal Pn from the electro-pneumatic converting device 4 is provided in addition to the structure above in FIG. 7, where the pressure sensor 8 sends the pressure value for the pneumatic pressure signal Pn thus detected to the calculating unit 7.

Additionally, instead of the positioner positive/negative operating parameter storing portion 6, as with the example in FIG. 3, an electro-pneumatic converting device positive/negative operating parameter storing portion 6-1 and a pilot relay positive/negative operating parameter storing portion 6-2 are provided. Additionally, an electro-pneumatic converting device operating mode identifying function 1B1, a pilot relay operating mode identifying function 1B2, and a positioner operating mode determining function 1B3, are provided as functions that structure the positioner operating mode identifying function 1B in the calculating unit 1.

Change in the Operating Mode of the Positioner

At this point, let us assume that the operating mode of the positioner 100 is the positive operating mode, and it has been changed to the negative operating mode. For example, while the direction of change in the control output K was "+" and the direction of change in the amplified pneumatic pressure signal Pout (Pout1) was "+", let us assume the selection of the negative operating mode as the operating mode for the multimode pilot relay 9 causes the direction of change in the control output K to be "+" and the direction of change in the amplified pneumatic pressure signal Pout (Pout2) to be "−".

The calculating unit 1 monitors the change in the pneumatic pressure signal Pn in accordance with the change in the control output K by the pneumatic converting device operating mode identifying function 1B1. In this case, when the direction of change of the control output K is "+" and the direction of change in the pneumatic pressure signal Pn remains as "+" without changing, then the calculating unit 1 identifies, through the electro-pneumatic converting device operating mode identifying function 1B1, that the operating mode of the electro-pneumatic converting device 2 is the positive operating mode. That is, the current operating mode of the electro-pneumatic converting device 2 is identified as the positive operating mode.

Additionally the calculating unit 1 monitors the change in the amplified pneumatic pressure signal Pout (Pout1, Pout2) in accordance with the change in the pneumatic pressure signal Pn by the pilot relay operating mode identifying function 1B2. When the direction of change of the pneumatic pressure signal Pn is "+" and the direction of change in the amplified pneumatic pressure signal Pout (Pout2) goes to "−", then the calculating unit 1 identifies, through the pilot relay converting operating mode identifying function 1B2, that the operating mode of the multimode pilot relay 9 is the negative operating mode. That is, the current operating mode of the multimode pilot relay 9 is identified as the negative operating mode.

Through this, the calculating unit 1, through the positioner operating mode determining function 1B3, determines that the operating mode of the positioner 100 is the negative operating mode from the identification result (positive operating mode) for the operating mode of the electro-pneumatic converting device 2 by the electro-pneumatic converting device operating mode identifying function 1B1 and the identification result for the operating mode (negative operating mode) for the multimode pilot relay 9 by the pilot relay operating mode identifying function 1B2. The determination result by the positioner operating mode determining function 1B3 is defined as the identification result for the operating mode of the positioner 100 by the positioner operating mode identifying function 1B. The result of this identification is both set as the current operating mode of the positioner 100 itself, and displayed on the screen of the display unit 7.

Additionally, when the calculating unit 1 identifies that the operating mode of the electro-pneumatic converting device 2 is the positive operating mode, then it selects, as the parameter to actually be used, through the use parameter selecting function 1C, the positive operation parameter corresponding to the operating mode identified, of the positive operating parameter and the negative operating parameter stored in the electro-pneumatic converting device positive/negative operating parameter storing portion 6-1. Additionally, when the calculating unit 1 identifies that the operating mode of the multimode pilot relay 9 is the negative operating mode, then it selects, as the parameter to actually be used, through the use parameter selecting function 1C, the negative operation parameter corresponding to the operating mode identified, of the positive operating parameter and the positive operating parameter stored in the pilot relay positive/negative operating parameter storing portion 6-2. Furthermore, the selected parameter is set as the use parameter for the positioner 100. That is, the use parameters that had been set to this point, were that the operating mode of the electro-pneumatic converting device 2 was the positive operating mode and the operating mode for the multimode pilot relay 9 was the positive operating mode, are changed automatically to be set to use parameters wherein the operating mode for the electro-pneumatic converting device 2 is the positive operating mode and the operating mode for the multimode pilot relay 9 is the negative operating mode. The use parameter for which the setting has been changed is displayed on the screen of the display unit 7.

Note that in this case, the selection of the negative operating mode as the operating mode for the multimode pilot relay 9 was explained for the case wherein the operating mode of the positioner 100 was changed from the positive operating mode to the negative operating mode; however, the same is true also for the case wherein the operating mode of the electro-pneumatic converting device 2 is changed from the positive operating mode to the negative operating mode through a change in the direction of the supply of the electric current to the magnetic excitation coil, where the operating mode of the positioner 100 is identified based on the current operating mode of the electro-pneumatic converting device 2 and the current operating mode of the multimode pilot relay 9, and that identified operating mode is set as the current operating mode of the positioner 100 itself, and also displayed on the display unit 7. Additionally, the setting changes for the use parameters in accordance with the identified operating modes for the electro pneumatic converting device 2 and the multimode pilot relay 9 may be performed automatically.

The direction of change of the control output K is "+", the direction of change in the pneumatic pressure signal Pn is "−", and the direction of change in the amplified pneumatic pressure signal Pout (Pout1) is "−", and thus, in the calculating unit 1, the operating mode of the positioner 100 is identified as being the negative operating mode based on the two identification results of the identification of the operating mode of the electro-pneumatic converting device 2 as the negative operating mode and the identification of the operating mode of the multimode pilot relay 9 as the positive operating mode.

Additionally, while in this example the explanation is for a case wherein the operating mode of the positioner 100 was the positive operating mode and there was a change to the negative operating mode, the same is true also for the case wherein the operating mode of the positioner 100 is the negative operating mode and there is a change to the positive operating mode, where the operating mode of the positioner 100 is identified based on the current operating mode of the electro-pneumatic converting device 2 and on the current operating mode of the multimode pilot relay 9, and the identified operating mode is set as the current operating mode of the positioner 100 itself, and also displayed on the display unit 7. Moreover, the change in setting of the use parameter accompanying the operating mode that has been identified for the positioner 100 is performed automatically.

In the example of FIG. 3 and FIG. 8, set forth above, the positive operating parameter that is used when the operating mode of the electro-pneumatic converting device 2 is the positive operating mode and the negative operating parameter that is used when the operating mode of the electro-pneumatic converting device 2 is the negative operating mode are stored in the electro-pneumatic converting device positive/negative operating parameter storing portion 6-1, and the positive operating parameter used when the operating mode of the multimode pilot relay 9 is the positive operating mode and the negative operating parameter used when the operating mode of the multimode pilot relay 9 is the negative operating mode are stored in the pilot relay positive/negative operating parameter storing portion 6-2; however, as illustrated in FIG. 9, four types of parameter settings may be stored, in accordance with the combinations of the operating modes of the electro-pneumatic converting device 2 and the multimode pilot relay 9, in the positioner positive/negative operating parameter storing portion 6.

Additionally, when the operating mode of the electro-pneumatic converting device 2 is unchanging and only the operating mode of the multimode pilot relay 9 changes, then, as illustrated in FIG. 10, conversely two types of parameters may be set and stored, depending on the combination of the operating modes of the electro-pneumatic converting device 2 and the multimode pilot relay 9. Similarly, when the multimode pilot relay 9 is unchanging and only the operating mode of the operating mode of the electro-pneumatic converting device 2 changes, then, as illustrated in FIG. 11, conversely two types of parameters may be set and stored, depending on the combination of the operating modes of the electro-pneumatic converting device 2 and the multimode pilot relay 9.

Additionally, while in the present example the positioner 100 identified the operating modes of the electro-pneumatic converting device 2 and of the single-mode pilot relay 9 automatically, instead the operating modes of the electro-pneumatic converting device 2 and of the multimode pilot relay 3 may be set from the outside, and the parameters to be used may be selected based on the operating mode that has been set from the outside.

As can be understood from the above, in the positioners 100 set forth above, because the current operating mode of the positioner 100 is identified as either the positive operating mode or the negative operating mode by the positioner operating mode identifying function 1B, provided in the calculating unit 1, and the identification results are set automatically, and because the parameters corresponding to the current operating mode of the positioner 100 that has been identified are selected by the use parameter selecting function 1C provided in the calculating unit 1 and are set automatically as the use parameters, when the setting for the operating mode of the positioner 100 has been changed, the settings for the current operating mode of the positioner itself and for the various types of parameters need not be performed artificially, thus eliminating the complex operations that had been required in the past. Additionally, there will be no cases wherein the operations to update the settings of the current operating mode of the positioner itself or the settings for the various parameters are forgotten, nor cases wherein the updating of the settings for the various parameters cannot be performed accurately, making it possible to eliminate cases wherein the opening is not controlled correctly because the various parameters in the settings do not match the operating mode of the positioner.

The positioner in the present invention is a device for converting an electric signal into an electro-pneumatic pressure signal, to control the opening of a control valve based on the converted electro-pneumatic pressure signal, and thus can be used in a variety of fields such as process control.

The invention claimed is:

1. A positioner comprising:
a control output generator calculating a deviation between a valve opening setting value sent from a higher-level device and an actual opening value that is fed back from a control valve that is subject to control, to generate, as a control signal, an electric signal in accordance with the deviation;
an electro-pneumatic converter converting into a pneumatic pressure signal a control output generated by the control output generator; and
a pneumatic pressure signal amplifier amplifying the pneumatic pressure signal that was converted by the electro-pneumatic converter and outputting, to an operating device for the control valve, as an amplified pneumatic pressure signal,
the positioner further comprising:
a positioner operating mode identifier identifying whether an operating mode of the positioner is a positive operating mode wherein the greater the control output the greater the amplified pneumatic pressure signal, or the less the control output the less the amplified pneumatic pressure signal, or a negative operating mode wherein the greater the control output the less the amplified pneumatic pressure signal, or the less the control output the greater the amplified pneumatic pressure signal;

a positioner positive/negative operating parameter storage storing positive operating parameters for control used when the operating mode of the positioner is the positive operating mode and negative operating parameters for control used when the operating mode of the positioner is the negative operating mode; and a use parameter selector selecting, as actual parameters for control to be used, those parameters for control, which correspond to the operating mode that has been identified by the positioner operating mode identifier, among the positive operating parameters for control and negative operating parameters for control stored in the positioner positive/negative operating parameter storage, wherein the operating mode identified by the positioner operating mode identifier remains unchanged while the opening of the control valve is controlled by the actual parameters selected by the use parameter selector as corresponding to the operating mode.

2. A positioner comprising:

a control output generator calculating a deviation between a valve opening setting value sent from a higher-level device and an actual opening value that is fed back from a control valve that is subject to control, to generate, as a control signal, an electric signal in accordance with the deviation;

an electro-pneumatic converter converting into a pneumatic pressure signal a control output generated by the control output generator; and a pneumatic pressure signal amplifier amplifying the pneumatic pressure signal that was converted by the electro-pneumatic converter and outputting, to an operating device for the control valve, as an amplified pneumatic pressure signal, the positioner further comprising:

an electro-pneumatic converter operating mode identifier identifying whether an operating mode of the electro-pneumatic converter is a positive operating mode wherein the greater the control output the greater the pneumatic pressure signal, or the less the control output the less the pneumatic pressure signal, or a negative operating mode wherein the greater the control output the less the pneumatic pressure signal, or the less the control output the greater the pneumatic pressure signal;

a pneumatic pressure signal amplifier operating mode identifier identifying whether an operating mode of the pneumatic pressure signal amplifier is a positive operating mode wherein the greater the pneumatic pressure signal the greater the amplified pneumatic pressure signal, or the less the pneumatic pressure signal the less the amplified pneumatic pressure signal, or a negative operating mode wherein the greater the pneumatic pressure signal the less the amplified pneumatic pressure signal, or the less the pneumatic pressure signal the greater the amplified pneumatic pressure signal;

an electro-pneumatic converter positive/negative operating parameter storage storing positive operating parameters for control used when the operating mode of the electro-pneumatic converter is the positive operating mode and negative operating parameters for control used when the operating mode of the electro-pneumatic converter is the negative operating mode;

a pneumatic pressure signal amplifier positive/negative operating parameter storage storing positive operating parameters for control used when the operating mode of the pneumatic pressure signal amplifier is the positive operating mode and negative operating parameters for control used when the operating mode of the pneumatic pressure signal amplifier is the negative operating mode; and a use parameter selector selecting, as actual parameters for control to be used, those parameters for control, which correspond to the operating mode that has been identified by the electro-pneumatic converter operating mode identifier, among the positive operating parameters for control and negative operating parameters for control stored in the electro-pneumatic converter positive/negative operating parameter storage, and selecting, as the actual parameters for control to be used, those parameters for control, which correspond to the operating mode that has been identified by the pneumatic pressure signal amplifier operating mode identifier, among the positive operating parameters for control and negative operating parameters for control stored in the pneumatic pressure signal amplifier positive/negative operating parameter storage, wherein the operating modes identified by the electro-pneumatic converter operating mode identifier and the pneumatic pressure signal amplifier operating mode identifier remain unchanged while the opening of the control valve is controlled by the actual parameters selected by the use parameter selector as corresponding to the operating modes.

3. A positioner comprising:

a control output generator calculating a deviation between a valve opening setting value sent from a higher-level device and an actual opening value that is fed back from a control valve that is subject to control, to generate, as a control signal, an electric signal in accordance with the deviation;

an electro-pneumatic converter converting into a pneumatic pressure signal control output generated by the control output generator; and a pneumatic pressure signal amplifier amplifying the pneumatic pressure signal that was converted by the electro-pneumatic converter and outputting, to an operating device for the control valve, as an amplified pneumatic pressure signal, the positioner further comprising:

an electro-pneumatic converter operating mode identifier identifying whether an operating mode of the electro-pneumatic converter is a positive operating mode wherein the greater the control output the greater the pneumatic pressure signal, or the less the control output the less the pneumatic pressure signal, or a negative operating mode wherein the greater the control output the less the pneumatic pressure signal, or the less the control output the greater the pneumatic pressure signal;

a pneumatic pressure signal amplifier operating mode identifier identifying whether an operating mode of the pneumatic pressure signal amplifier is a positive operating mode wherein the greater the pneumatic pressure signal the greater the amplified pneumatic pressure signal, or the less the pneumatic pressure signal the less the amplified pneumatic pressure signal, or a negative operating mode wherein the greater the pneumatic pressure signal the less the amplified pneumatic pressure signal, or the less the pneumatic pressure signal the greater the amplified pneumatic pressure signal;

a positioner positive/negative operating parameter storage storing a set of positive operating parameters for control used when the operating mode of the positioner is the positive operating mode and a set of negative operating parameters for control used when the operating mode of the positioner is the negative operating mode, established in accordance with a combination of operating modes assumed by the electro-pneumatic converter and the pneumatic pressure signal amplifier; and a use parameter selector selecting, as the actual parameter set to be used, that parameter set that corresponds to the combination of an operating mode that has been identified by the electro-pneumatic converter operating mode identifier and an operating mode that has been identified by the pneumatic pressure signal amplifier operating mode identifier, from the set of positive operating parameters for control and the set of negative operating parameters for control stored in the positioner positive/negative operating parameter storage, wherein the operating modes identified by the electro-pneumatic converter operating mode identifier and the pneumatic pressure signal amplifier operating mode identifier remain unchanged while the opening of the control valve is controlled by the actual parameter set selected by the use parameter selector as corresponding to the combination of the operating modes.

4. The positioner as set forth in claim 1, further comprising:
a use parameter notifier providing notification of a parameter for control selected, by the use parameter selector, as a parameter for control to actually be used.

5. The positioner as set forth in claim 2, further comprising:
a use parameter notifier providing notification of a parameter for control selected, by the use parameter selector, as a parameter for control to actually be used.

6. The positioner as set forth in claim 3, further comprising:
a use parameter notifier providing notification of a parameter for control selected, by the use parameter selector, as a parameter for control to actually be used.

* * * * *